United States Patent Office 3,154,517
Patented Oct. 27, 1964

3,154,517
METHOD OF VULCANIZING RUBBER IN THE PRESENCE OF 2-(2,6-DIMETHYL-4-MORPHOLINYLMERCAPTO) BENZOTHIAZOLES AND PRODUCT OBTAINED
John J. D'Amico, Nitro, W. Va., assignor to Monsanto Company, a corporation of Delaware
No Drawing. Filed Aug. 21, 1958, Ser. No. 756,285
12 Claims. (Cl. 260—41.5)

The invention relates to accelerating vulcanization of rubber with a new class of accelerators. More particularly, this invention relates to accelerating vulcanization of rubber with 2-(2,6-dimethyl-4-morpholinylmercapto)benzothiazole and to rubber compositions containing the new accelerator.

The new accelerator possesses a remarkable combination of desirable properties. It affords a large margin of processing safety and is a stable, light colored, relatively high melting crystalline solid which forms in substantially quantitative yield by oxidative condensation of mercaptobenzothiazole and 2,6-dimethyl morpholine. The technical product is essentially pure after filtering from the reaction medium, washing and drying and can be stored for an indefinite period without change. Halogen and alkyl substituted mercaptobenzothiazoles also condense with 2,6-dimethyl morpholine to yield stable, high melting solids. On the other hand, 3,5-dimethyl-4-morpholinylmercaptobenzothiazole is resinous. The known 2-(4-morpholinylmercapto)benzothiazole forms with difficulty, is always contaminated with 2,2'-dithiobis benzothiazole and steadily decomposes during storage. The preparation and properties of the new compound and typical examples of substituted derivatives thereof are described in further detail below.

EXAMPLE 1

A solution of the sodium salt of 2-mercaptobenzothiazole was prepared by mixing 43 grams (0.25 mole) of 97% 2-mercaptobenzothiazole, 40 grams (0.25 mole) of 25% sodium hydroxide and 50 grams of water. After stirring for an hour, 115 grams (1.0 mole) of 2,6-dimethyl morpholine (U.S. Patent 1,859,527) was added in 15 minutes at 20–25° C. and the mixture stirred for another 5 minutes. There was then added 42 ml. (0.125 mole) of 25% sulfuric acid while maintaining the temperature at 20–25° C. After 5 minutes additional stirring and at 25–35° C. there was added over a period of 85 minutes 155 ml. (0.30 mole) of sodium hypochlorite solution containing 14.47 grams of sodium hypochlorite per 100 ml. The mixture was stirred at 34–35° C. for an hour longer and the excess hypochlorite then destroyed by the addition of 5 grams of sodium sulfite. The product was cooled to 25° C. by the addition of cold water, separated by filtration, washed neutral and dried for 12 hours in a 50° C. forced air oven. This procedure gave a quantitative yield of 2-(2,6-dimethyl-4-morpholinylmercapto)benzothiazole, M.P. 94–96° C. Analysis gave 22.90% sulfur as compared to 22.87% calculated for $C_{13}H_{16}N_2OS_2$.

EXAMPLE 2

To a stirred solution containing 45.3 grams (0.25 mole) of 4-methyl-2-mercaptobenzothiazole, 40 grams (0.25 mole) of 25% sodium hydroxide and 50 grams of water was added dropwise 115.2 grams (1.0 mole) of 2,6-dimethyl morpholine over a period of 15 minutes and stirring continued for another 15 minutes. Then 50 ml. (0.15 mole) of 25% sulfuric acid was added dropwise during another 15 minutes and stirring continued as before for an additional 15 minutes. Then 151 ml. (0.3 mole) of sodium hypochlorite solution containing 14.9 grams of sodium hypochlorite per 100 ml. was added dropwise at 25–33° C. over a 90 minute period, the reaction mixture stirred for a 90 minute period at 25–30° C. and 3 grams of sodium sulfite used to destroy the hypochlorite. The mixture was filtered and the separated solids washed with water until the washings were neutral to litmus and air-dried at room temperature. The 2-(2,6-dimethyl-4-morpholinylmercapto)-4-methyl benzothiazole so obtained was a tan solid which, after recrystallization from ethyl alcohol, melted at 87–88° C. Analysis gave 9.79% nitrogen and 22.11% sulfur as compared to 9.52% nitrogen and 21.78% sulfur calculated for $C_{14}H_{18}N_2OS_2$.

EXAMPLE 3

5-chloro-2-mercaptobenzothiazole was substituted for 2-mercaptobenzothiazole in the procedure of Example 2. In this example 230.4 grams (2.0 moles) of 2,6-dimethyl morpholine was used, 50 ml. of 25% sulfuric acid and 155 ml. (0.3 mole) of sodium hypochlorite solution containing 14.9 grams of sodium hypochlorite per 100 ml. The hypochlorite was added at 30–40° C. and stirred for an hour at this temperature. The 2-(2,6-dimethyl-4-morpholinylmercapto)-5-chlorobenzothiazole, M.P. 97–99° C., was obtained in 99% theory yield. Analysis gave 20.37% sulfur and 11.59% chlorine as compared to 20.37% sulfur and 11.26% chlorine calculated for $C_{13}H_{15}ClN_2OS_2$.

Stability was measured after shelf aging by analyzing for 2,2'-dithiobis benzothiazole. The latter is insoluble in ether whereas the desired products are readily soluble and it is therefore convenient to express the results as percent ether insoluble. An increase in percentage of ether insolubles indicates decomposition. The results are shown in Table I.

*Table I*

|  | Percent Ether Insoluble After Storage at Room Temperature | | | |
| --- | --- | --- | --- | --- |
|  | 0 Days | 128 Days | 365 Days | 730 Days |
| 2-(4-Morpholinylmercapto)benzothiazole | 0.44 | -------- | 13.0 | -------- |
| 2-(2,6-Dimethyl-4-morpholinylmercapto)benzothiazole | 0.32 | 0.16 | -------- | 0.16 |

The figures show no change in 2-(2,6-dimethyl-4-morpholinylmercapto)benzothiazole, all determinations being within experimental error.

Sulfenamide accelerators are commercially important because of the processing safety which they contribute. Further to increase the processing safety it is known to use sulfenamide accelerators in conjunction with a nitrosoamine retarder. Comparing sulfenamide accelators in a stock without a retarder is not necessarily indicative of their relative merit in the presenec of a nitrosoamine retarder. Significantly, the new accelerators outstandingly increase processing safety in stocks containing a nitrosoamine retarder. Evaluation was carried out in base formulations comprising

|  | Parts by weight | | |
| --- | --- | --- | --- |
| Stock | A | B | C |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 1.0 | 0.8 |
| Dinitroso diphenyl-p-phenylenediamine | 1.5 | 1.5 | 1.5 |
| Dicyclohexylamine | -------- | 1.0 | 1.0 |

One of the high pH blacks, an H.A.F. black, was used in the formulations. These blacks lack the inherent retarding action of channel blacks. The processing safety of the base stocks containing the test accelerator was evaluated by heating in a Mooney plastometer. The time in minutes required for the placticity to increase 10 points above the minimum was determined. These values, commonly known as "Mooney scorch time," are a measure of processing safety, higher Mooney scorch times indicating greater processing safety. The results are recorded below:

*Table II*

| Base Stock | Amount of Accelerator | Temp. of Heating, °C. | Mooney Scorch Time in Minutes | |
|---|---|---|---|---|
| | | | 2-(4-Morpholinylmercapto)benxothiazole | 2-(2 6-Dimethyl-4-morpholinylmercapto)benzothiazole |
| A | 0.7 | 135 | 17.6 | 22.9 |
| B | 1.0 | 135 | 13.9 | 21.2 |
| C | 1.5 | 135 | 13.8 | 22.5 |

The base stocks containing the test accelerator were vulcanized in the usual manner by heating in a press for different periods of time and the physical properties of the vulcanizates examined. The 300% modulus figures for the 45 minute cures at 292° F. are recorded in Table III below:

*Table III*

| Base Stock | Amount ot Accelerator | 300+ Modulus at 45 min cure | |
|---|---|---|---|
| | | 2-(4-Morpholinylmercapto)benzothiazole | 2-(2,6-Dimethyl-4-morpholinylmercapto)benzothiazole |
| A | 0.5 | 2,116 | 2,340 |
| B | 1.0 | 2,120 | 2,150 |
| C | 1.5 | 1,810 | 2,050 |

The results show that 2-(2,6-dimethyl-4-morpholinylmercapto)benzothiazole is a stronger accelerator and imparts more processing safety in the presence of a nitrosoamine retarder. The nitrosoamine retarders are well known to rubber compounders. Examples are N-nitrosodiphenylamine, N-nitroso N-phenyl-beta-naphthylamine, N-nitroso-1,2-dihydro-2,2,4-trimethylquinoline, N-nitroso-6-ethoxy-1,2-dihydro-2-,2,4-trimethylquinoline and nitrosated N-cyclohexyl-N'-phenyl-p-phenylenediamine.

Further base formulations were compounded comprising

| | Parts by weight | | |
|---|---|---|---|
| Stock | D | E | F |
| Smoked sheets rubber | 100 | 100 | 100 |
| Carbon black | 50 | 50 | 50 |
| Zinc oxide | 5 | 5 | 5 |
| Stearic acid | 2 | 3 | 3 |
| Saturated hydrocarbon softener | 3 | 3 | 3 |
| Sulfur | 2.5 | 2.5 | 2.5 |
| 6-Ethoxy-1,2-dihydro2,2,4-trimethylquinoline | | 1.5 | 1.5 |
| N-Nitroso diphenylamine | | | 1.0 | ing The carbon black used in these formulations was H.A.F. black. The accelerator was added to the base stock described and processing safety at 121° C. evaluated with a Mooney plastometer in the manner described. The data are recorded in Table IV.

*Table IV*

| Base Stock | Amount of Accelerator | Temp. of Heating, °C. | Mooney Scorch Time in Minutes | |
|---|---|---|---|---|
| | | | 2-(4-Morpholinylmercapto)benzothiazole | 2-(2,6-Dimethyl-4-morpholinylmercapto)benzothiazole |
| D | 0.5 | 121 | 23.0 | 29.0 |
| E | 0.5 | 121 | 24.0 | 30.3 |
| F | 0.5 | 121 | 51.2 | 66.6 |

The base stocks containing the test accelerator were vulcanized in the usual manner by heating in a press for different periods of time and the physical properties of the vulcanizates examined. The 300% modulus figures for the 45 minute cures at 292° F. are recorded in Table V below:

*Table V*

| Base Stock | Amount ot Accelerator | 300+ Modulus at 45 min cure | |
|---|---|---|---|
| | | 2-(4-Morpholinylmercapto)benzothiazole | 2-(2,6-Dimethyl-4-morpholinylmercapto)benzothiazole |
| D | 0.5 | 1,986 | 2,286 |
| E | 0.5 | 2,130 | 2,280 |
| F | 0.5 | 2,260 | 2,450 |

The relative instability of 2-(4-morpholinylmercapto)benzothiazole increases the difficulty of assessing precisely the influence which methyl groups in the morpholine ring of 2-(2,6-dimethyl - 4 - morpholinylmercapto)benzothiazole exert on processing safety independent of other variables. However, testing pure samples of each immediately after preparation in Hevea rubber stocks demonstrated that the methyl groups contributed significantly to processing safety, especially in the presence of a nitrosoamine retarder. A sample of freshly prepared pure 2-(4-morpholinylmercapto)benzothiazole, M.P. 87–88.5° C., containing 0.16% ether insoluble material was used as the control. A sample of 2-(2,6-dimethyl-4-morpholinylmercapto)benzothiazole, M.P. 104.5–106° C., containing less than 0.1% ether insoluble material was prepared and the samples incorporated immediately in rubber compositions comprising

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| N-nitrosodiphenylamine | 1.0 |
| Accelerator | 0.5 |

The processing safety evaluated in the manner described gave the following results:

*Table VI*

| | 2-(4-Morpholinylmercapto)benzothiazole | 2-(2,6-Dimethyl-4-morpholinylmercapto)benzothiazole |
|---|---|---|
| Mooney Scorch at 121° C | 70.4 | 75.0 |

As exemplary of the accelerating action in synthetic rubber, vulcanizable compositions were compounded comprising

| Stock | Parts by weight | |
| --- | --- | --- |
| | G | H |
| Styrene-butadiene copolymer rubber (SBR 1500) | 100 | 100 |
| Carbon black | 50 | 50 |
| Zinc oxide | 4 | 4 |
| Stearic acid | 2 | 2 |
| Sulfur | 1.75 | 1.75 |
| Saturated hydrocarbon softener | 10 | 10 |
| 1,2-Dihydro-6-ethoxy-2,2,4-trimethylquinoline | 2 | 2 |
| 2-(4-Morpholinylmercapto)benzothiazole | 1.2 | |
| 2-(2,6-Dimethyl-4-morpholinylmercapto) benzothiazole | | 1.2 |

Processing safety evaluated in the manner described gave these results:

*Table VII*

| Stock | G | H |
| --- | --- | --- |
| Mooney Scorch at 135° C | 27.5 | 32.0 |

Both stocks reached optimum cure in 60 minutes at 144° C., Stock G attaining a modulus at 300% elongation of 1690 and Stock H 1710 pounds per square inch respectively.

The process of the invention can be carried out with any of the sulfur vulcanizable diene rubbers. This class of rubbers contains a diene hydrocarbon in the polymer structure which contributes unsaturation and sulfur vulcanizability. They include styrene-butadiene copolymer rubbers, polybutadiene, natural rubber, synthetic polyisoprene. Delayed action accelerators are important for use in vulcanizing rubbers in which a diene hydrocarbon contributes a major proportion of the polymer but accelerate vulcanization of isobutylene polymerized in the presence of a small amount of a diene hydrocarbon (butyl rubber).

Elemental sulfur ordinarily constitutes the vulcanizing agent but sulfur vulcanizing agents include organic compounds which contain sulfur that becomes available for cure upon incorporating the compound into rubber and heating the mixture. Various N,N'-thioamines are known to be vulcanizing agents, as for example N,N'-dithiobis morpholine, and may be used in the practice of the invention. In general, any sulfur vulcanizing agent is suitable whether in the form of elemental sulfur or selenium or in the form of a sulfur compound which releases sulfur at vulcanizing temperature. The sulfur level can be varied to achieve particular objectives. The delayed action accelerator may be used alone or in combination with other accelerators, as for example diphenyl guanidine, di-o-tolyl guanidine and diphenyl guanidine phthalate. For most purposes the accelerators of the invention will be used in amounts within the range of 0.1–5% of the rubber.

It is intended to cover all changes and modifications of the examples of the invention herein chosen for purposes of disclosure which do not constitute departures from the spirit and scope of the invention.

This application is a continuation-in-part of application Serial No. 555,296, filed December 27, 1955, now U.S. Patent No. 2,871,239, granted January 27, 1959.

What is claimed is:

1. The process of compounding and vulcanizing a sulfur vulcanizable diene rubber selected from the group consisting of natural rubber, styrene-butadiene copolymer rubber, poly-butadiene rubber and polyisoprene rubber which comprises preparing a vulcanizable mix by incorporating into the massed rubber, elemental sulfur in amount sufficient for vulcanization an N-nitroso aromatic amine retarder in proportion sufficient to inhibit pre-vulcanization and an accelerating amount of an accelerator selected from the group consisting of 2-(2,6-dimethyl-4-morpholinylmercapto)benzothiazole, 2-(2,6-dimethyl - 4-morpholinylmercapto)chlorobenzothiazole and 2-(2,6-dimethyl - 4 - morpholinylmercapto)lower alkylbenzothiazole, said vulcanizable mix having a Mooney scorch time greater than about 21 minutes at 135° C. and vulcanizing the mix by heating at vulcanizing temperature.

2. The process of compounding and vulcanizing a sulfur vulcanizable diene rubber selected from the group consisting of natural rubber, styrene-butadiene copolymer rubber, polybutadiene rubber and polyisoprene rubber which comprises preparing a vulcanizable mix by incorporating into the massed rubber elemental sulfur in amount sufficient for vulcanization, an N-nitroso aromatic amine retarder in proportion sufficient to inhibit pre-vulcanization and an accelerating amount of 2-(2,6-dimethyl-4-mohpholinylmercapto)benzothiazole, said vulcanizable mix having a Mooney scorch time greater than about 21 minutes at 135° C. and vulcanizing the mix by heating at vulcanizing temperature.

3. The process of compounding and vulcanizing a sulfur vulcanizable diene rubber selected from the group consisting of natural rubber, styrene-butadiene copolymer rubber, polybutadiene rubber and polyisoprene rubber which comprises preparing a vulcanizable mix by incorporating into the massed rubber carbon black, elemental sulfur in amount sufficient for vulcanization, an N-nitroso aromatic amine retarder in proportion sufficient to inhibit pre-vulcanization and an accelerating amount of 2-(2,6-dimethyl - 4 - morpholinylmercapto)benzothiazole, said vulcanizable mix having a Mooney scorch time greater than about 21 minutes at 135° C. and vulcanizing the mix by heating at vulcanizing temperature.

4. The process of compounding and vulcanizing a sulfur vulcanizable diene rubber selected from the group consisting of natural rubber, styrene-butadiene copolymer rubber, polybutadiene rubber and polyisoprene rubber which comprises preparing a vulcanizable mix by incorporating into the massed rubber furnace carbon black, elemental sulfur in amount sufficient for vulcanization, N-nitrosodiphenylamine in proportion sufficient to inhibit pre-vulcanization and an accelerating amount of 2-(2,6-dimethyl - 4 - morpholinylmercapto)benzothiazole, said vulcanizable mix having a Mooney scorch time greater than about 21 minutes at 135° C. and vulcanizing the mix by heating at vulcanizing temperature.

5. The process of compounding and vulcanizing styrene-butadiene copolymer rubber which comprises preparing a vulcanizable mix by incorporating into massed styrene-butadiene copolymer rubber furnace carbon black, elemental sulfur in amount sufficient for vulcanization, N-nitrosodiphenylamine in proportion sufficient to inhibit pre-vulcanization and an accelerating amount of 2-(2,6-dimethyl - 4 - morpholinylmercapto)benzothiazole, said vulcanizable mix having a Mooney scorch time greater than about 21 minutes at 135° C. and vulcanizing the mix by heating at vulcanizing temperature.

6. The process of compounding and vulcanizing natural rubber which comprises preparing a vulcanizable mix by incorporating into massed natural rubber furnace carbon black, elemental sulfur in amount sufficient for vulcanization, N-nitrosodiphenylamine in proportion sufficient to inhibit pre-vulcanization and an accelerating amount of 2-(2,6-dimethyl - 4 - morpholinylmercapto)benzothiazole, said vulcanizable mix having a Mooney scorch time greater than about 21 minutes at 135° C. and vulcanizing the mix by heating at vulcanizing temperature.

7. A vulcanizable composition having a Mooney scorch time greater than about 21 minutes at 135° C. comprising furnace carbon black, styrene-butadiene copolymer rubber, elemental sulfur in amount sufficient for vulcanization, N-nitrosodiphenylamine in proportion sufficient to inhibit pre-vulcanization and an accelerating amount of 2-(2,6-dimethyl - 4 - morpholinylmercapto)benzothiazole.

8. A vulcanizable composition having a Mooney scorch time greater than about 21 minutes at 135° C. comprising furnace carbon black, natural rubber, elemental sulfur in amount sufficient for vulcanization, N-nitrosodiphenylamine in proportion sufficient to inhibit pre-vulcanization and an accelerating amount of 2-(2,6-dimethyl-4-morpholinylmercapto)benzothiazole.

9. A method of vulcanizing a sulfur vulcanizable diene rubber selected from the group consisting of natural rubber, styrene-butadiene copolymer rubber, polybutadiene rubber, and polyisoprene rubber which comprises milling together a mixture comprising said rubber, sulfur, and a member of the group consisting of 2-(2,6-dimethyl-4-morpholinylmercapto)benzothiazole, 2-(2,6-dimethyl-4-morpholinylmercapto)chlorobenzothiazole, and 2-(2,6-dimethyl-4-morpholinylmercapto)lower alkylbenzothiazole and subjecting said mixture to heat for sufficient time to establish the cure of the elastomer.

10. A composition obtained by milling together an unvulcanized sulfur vulcanizable diene rubber selected from the group consisting of natural rubber, styrene-butadiene copolymer rubber, polybutadiene rubber and polyisoprene rubber, sulfur and 2-(2,6-dimethyl-4-morpholinylmercapto)benzothiazole.

11. A cured rubber product selected from the group consisting of natural rubber, styrene-butadiene copolymer rubber, polybutadiene rubber, and polyisoprene rubber, which has been vulcanized in the presence of sulfur and 2-(2,6-dimethyl-4-morpholinylmercapto)benzothiazole.

12. A composition obtained by milling together an unvulcanized sulfur vulcanizable diene rubber selected from the group consisting of natural rubber, styrene-butadiene copolymer rubber, polybutadiene rubber and polyisoprene rubber, furnace carbon black, sulfur and 2-(2,6-dimethyl-4-morpholinylmercapto)benzothiazole.

References Cited in the file of this patent

UNITED STATES PATENTS

| | | |
|---|---|---|
| 1,734,639 | Morse | Nov. 5, 1929 |
| 2,811,503 | Hand et al. | Oct. 29, 1957 |